United States Patent [19]
Alesu

[11] Patent Number: 5,705,993
[45] Date of Patent: Jan. 6, 1998

[54] AUTHENTICATION SYSTEM AND METHOD

[76] Inventor: Paul Alesu, 6061 De Zavala Rd. #701, San Antonio, Tex. 78249

[21] Appl. No.: 502,818

[22] Filed: Jul. 14, 1995

[51] Int. Cl.$^6$ ............... G06F 7/04; G06K 5/00; G06K 9/22; G06K 9/18
[52] U.S. Cl. ............ 340/825.3; 235/382; 382/120; 382/116
[58] Field of Search ............ 340/825.3, 825.34; 382/187, 119, 124

[56] References Cited

U.S. PATENT DOCUMENTS

| | | | |
|---|---|---|---|
| 3,618,019 | 11/1971 | Nemirovsky et al. | 340/146.3 |
| 3,713,099 | 1/1973 | Hemstreet | 340/146.3 D |
| 4,078,226 | 3/1978 | EerNisse et al. | 340/146.3 |
| 4,724,542 | 2/1988 | Williford | 382/3 |
| 5,553,156 | 9/1996 | Obata et al. | 382/119 |
| 5,559,895 | 9/1996 | Lee et al. | 382/119 |
| 5,559,897 | 9/1996 | Brown et al. | 382/186 |

*Primary Examiner*—Michael Horabik
*Assistant Examiner*—Anthony A. Asongwed

[57] ABSTRACT

A system and method of authentication electronic transactions in which personal hand writing patterns like signatures are used. Signatures are conveyed from sender to receiver through a data communications channel and stored as data streams. The method is based on the fact that nobody can hand write two identical patterns. The result of the authentication test is false if the new hand writing pattern is identical or too close to any of the previously stored patterns.

3 Claims, 2 Drawing Sheets

AUTHENTICATION SYSTEM AND METHOD

BACKGROUND OF THE INVENTION

1. Field of the Invention

The present invention relates to system and method of authentication and more particularly to a novel system and method in which personal hand writing patterns like signatures are conveyed and stored as data streams and the result of the authentication test is false if the new hand writing pattern is identical or too close to any of the previously stored genuine patterns.

2. Description of the Prior Art

The exponential spread of fast digital communications prompted the desire for electronic commercial transactions. The biggest problem faced by the electronic commerce seems to be generated by the easiness of copying data. Naturally, during a transaction data is sent from one place to another and it is very easy for some ill intended person to copy it and fake another transaction. This is why a lot of efforts were undertaken to find reliable means of authentication. The most popular is the use of key cryptography. When key cryptography is used there is need for a key certification authority. This adds extra costs to payment transactions and makes very difficult and expensive to secure the server of the certification authority. Using this method someone can be sure that the sender knows the key but cannot be sure that the sender is really the person entitled to use the key. Another method is to request confirmation by telephone which means that the issuer of the transaction must be at the telephone number previously known by the bank and that the transaction cannot take advantage of the digital communications speed.

SUMMARY OF THE INVENTION

It is, therefore, an object of the present invention to provide a novel system and method of authentication based on something so particular as personal hand writing patterns like signatures. This is accomplished in accordance with the invention by conveying real time personal hand writing patterns like signatures from issuer to the receiver as data streams, storing them at destination and comparing the new acquired hand writing pattern like signature against the stored ones. The result of the authentication is false if the new hand writing pattern like signature is identical or too close to any of the stored hand writing patterns like signatures this way supplying a very secure mean to detect an electronically forged pattern like signature.

DETAILED DESCRIPTION OF THE PREFERRED EMBODIMENT

Figure 1:
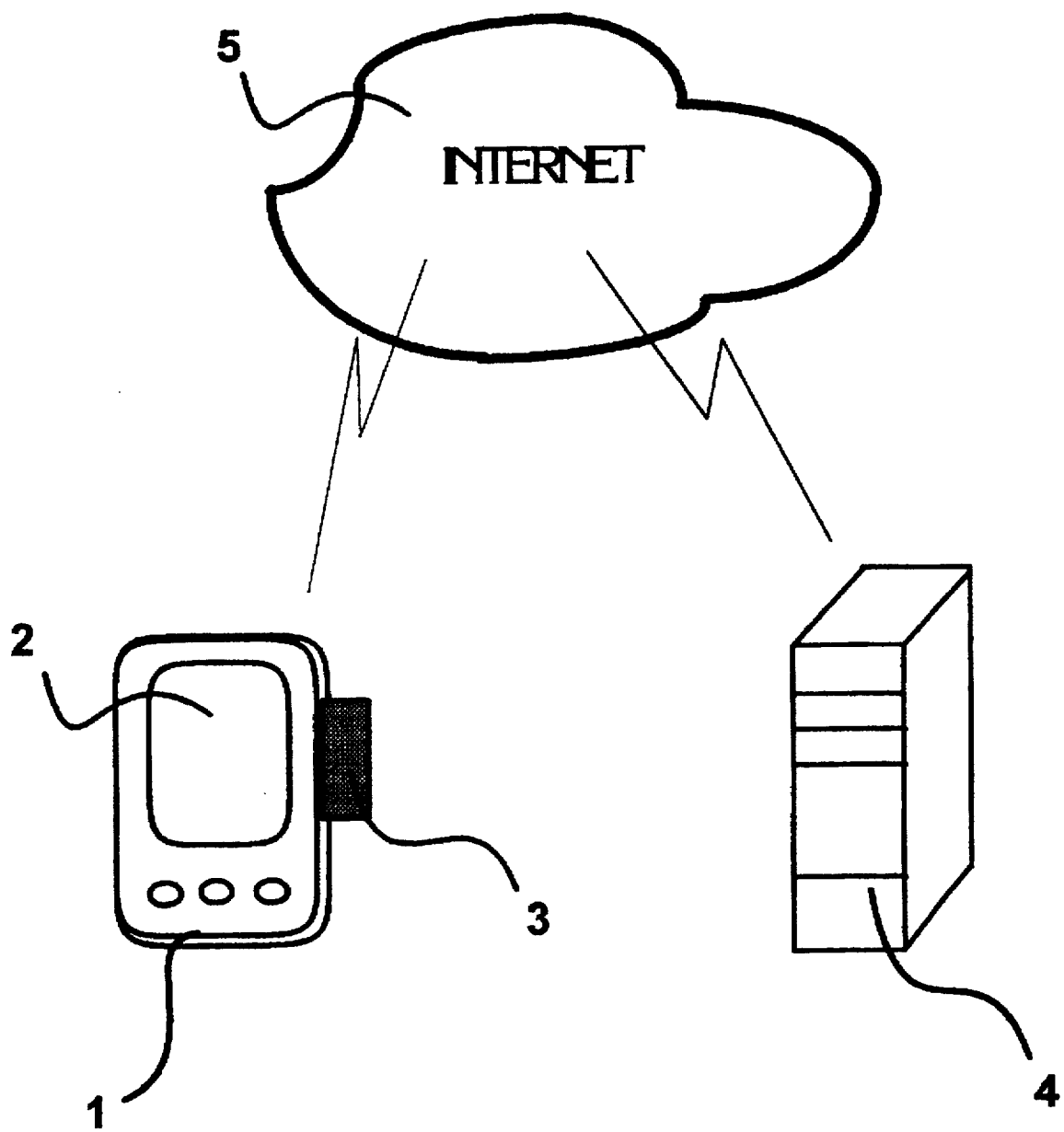
FIG. 1 represents the system in its entirety pointing out the most important components.
Figure 2:
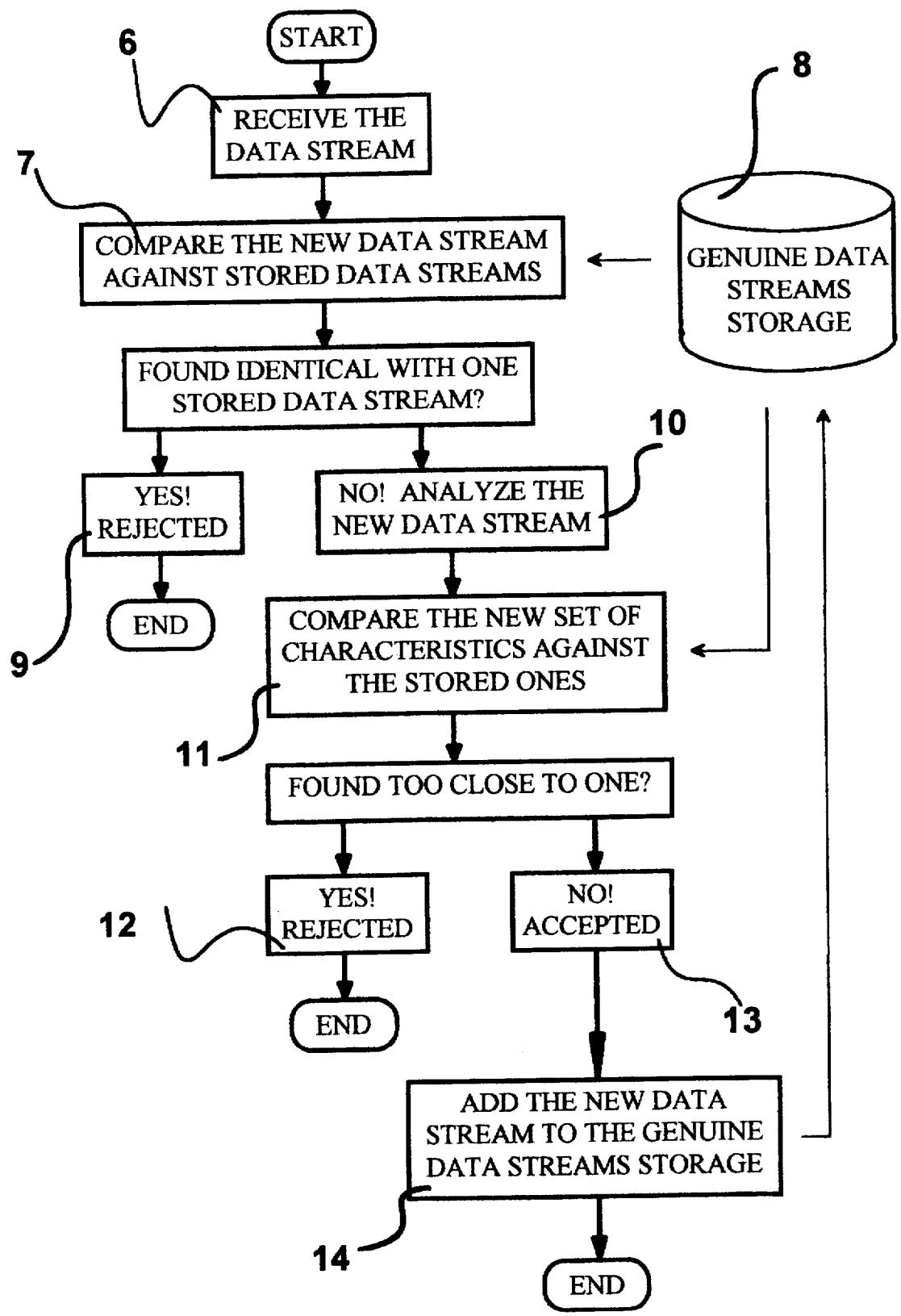
FIG. 2 is the logic diagram of the method.

The whole system contains three parts: the sender site, the receiver site and the communication channel. Each part is constituted by both hardware and software.

In our preferred embodiment the sender site is a pocket size personal digital assistant 1 which comprises a transparent surface 2 connected for generating position sensing signals in response to moving contact by a stylus and means like a modem 3 to connect to a data communication network.

Of course the sender site may be any hardware which can digitize and transmit personal hand writing like a personal computer with a digitizing tablet connected to a wide area network through a local area network or a laptop computer with a small digitizing tablet connected to a wide area network through a cellular telephone link.

In our preferred embodiment the receiver site is an Internet server 4. Of course the receiver site may be any data server.

In our preferred embodiment the communication channel is the Internet 5.

Of course the communication channel may be any data communication channel like a commercial data network or a private data network.

The sender site 1 links the sender with the communication channel 5, digitizes the sender's personal hand writing pattern like signature and transmits to the receiver 4 the data stream representing the sequence of the coordinates, pressures and so on.

The receiver site 4 receives 6 the data stream and compares it 7 against previously stored genuine data streams 8. If the new stream is identical with one of the stored genuine streams the new data streams received is definitely not genuine and is rejected 9. If the previously test passes, the data stream is analyzed 10 for specific hand writing characteristics including, but not limited to angles, length of strokes, speed of movements, relative distances, stylus pressure. Let's say that there are N hand writing characteristics in the personal pattern and let's name them $x_1, x_2, x_3, \ldots, x_N$.

This new set of hand writing characteristics is compared 11 against each of the genuine sets of hand writing characteristics previously stored and finds out N differences for each previously stored set. Let's name them $e_1, e_2, e_3, \ldots, e_N$.

If these differences are smaller than a minimum preset value, this new data stream received is not genuine and rejected 12.

Much more the receiver does some statistics on the previously stored sets of hand writing characteristics and finds out the spread of the hand writing characteristics. Mainly it finds out the minimum accepted differences for each hand writing characteristic. Let's name these minimum accepted differences as $m_1, m_2, m_3, \ldots, m_N$.

The receiver compares the differences $e_1, e_2, e_3, \ldots, e_N$ against the minimum accepted differences $m_1, m_2, m_3, \ldots, m_N$ and if any difference $e_k$ is smaller than the minimum accepted $m_k$ the software decides that this new data stream received is not genuine.

When a data stream is accepted 13 as genuine it will be added 14 to the previously stored genuine data 8.

This method is based on the fact that nobody can hand write a pattern like signature identical to any of the former or future similar patterns.

I claim:

1. An authentication system based on personal hand writing patterns comprising:

means for conveying personal hand writing patterns as data streams;

means for analyzing said data streams for specific hand writing characteristics including angles, length of strokes, speed of movements, relative distances, stylus pressure;

means for storing initial data streams as genuine specific hand writing characteristics sets;

means for comparing a specific hand writing characteristics set of a new data stream against said stored data stream of genuine specific hand writing characteristics sets in which the result of the authentication is false if the specific hand writing characteristics set of said new data stream are identical or substantially identical to any of the stored data streams of specific genuine hand writing characteristics sets;

means for adding the new data stream if accepted as genuine, to the previously stored data streams.

2. An authentication method based on personal hand writing patterns comprising the following steps:

conveying personal hand writing patterns as data streams;

analyzing said data streams for specific hand writing characteristics including angles, length of strokes, speed of movement, relative distances, stylus pressure;

comparing a specific hand writing characteristics set of a new data stream against said stored data streams of genuine specific hand writing characteristics sets in which the result of the authentication is false if said specific hand writing characteristics of the new data stream are identical or substantially identical to any of the stored data streams of genuine specific hand writing characteristics sets;

adding the new data stream if accepted as genuine, to the previously stored data streams.

3. An authentication method of claim 2 in which the substantially identical criteria is obtained by means of computing and storing statistics on said data streams of stored genuine hand writing characteristics sets.

* * * * *